Patented Oct. 15, 1929

1,731,849

UNITED STATES PATENT OFFICE

WILLIAM C. GEER, OF NEW ROCHELLE, NEW YORK, AND HARRY L. FISHER, OF LEONIA, NEW JERSEY, ASSIGNORS TO THE B. F. GOODRICH COMPANY, OF NEW YORK, N. Y., A CORPORATION OF NEW YORK

METHOD OF PRODUCING RUBBER COMPOSITIONS HAVING LOW-MOISTURE ABSORPTION

No Drawing. Continuation of application Serial No. 714,734, filed May 20, 1924. This application filed November 5, 1928. Serial No. 317,478.

This invention relates to compositions made from or containing rubber and its chief object is to provide rubber compositions having low moisture absorption, especially adapting them for marine cable or wire insulations, for example, where moisture absorption undesirably affects the electrical properties of the material. A further object is to provide plastic rubber derivatives of pure and uniform character. A still further object is economically to provide heat plastic rubber compositions by reducing the amount of the curing agent required.

In the copending applications of H. L. Fisher, Patent No. 1,668,235, filed January 14, 1924, and Patent No. 1,668,236, filed January 17, 1924, processes are described for the preparation of balata-like or shellac-like derivatives of rubber, by reacting thereon with a sulfuric acid, a sulfonic acid or a sulfonyl chloride, all of which may be described as acid reagents having the grouping $R-SO_2-X$, wherein R represents an organic radical or a hydroxy group and X represents chlorine or a hydroxy group. We now find that these acid reagents react with the resins, proteins and other natural impurities in the raw rubber and thereby transform them into water-soluble products. By washing such balata-like or shellac-like rubber derivatives with hot water on a rubber washing mill or by other suitable means, substantially all of the water absorbing impurities originally present in the crude rubber and all excess of reagents are removed and an improved product is obtained having a lower degree of moisture absorption, such product being better adapted for use in electrical insulation and the like than the unpurified material.

Our invention also comprises the removal of resins, proteins or other impurities from crude rubber and reacting thereon with sulfuric acids, sulfonic acids, sulfonyl chlorides or the like, whereby there is provided an improved class of rubber derivatives substantially free from moisture absorbing constituents. In such processes it is still desirable to wash the reaction product for the removal of further impurities such as excess of reagents.

The purification of the crude rubber as above mentioned may be accomplished, for example, by milling or otherwise forming an emulsion of rubber with such alkaline reagents as sodium carbonate, sodium hydroxide, sodium oleate or the like and heating the mixture in open steam or by boiling in water for from 10 to 36 hours. The modified proteins and resins, and the excess of alkali or other impurities, may then be removed by washing.

In the preparation of gutta percha substitutes as set forth in the copending application of W. C. Geer, Serial No. 708,585, filed April 23, 1924, it was found desirable to modify the plasticity of the reaction products of rubber, such as are hereinbefore mentioned, by milling into them certain percentages of crude rubber. We now find that the water absorption of the mixture may be substantially reduced by (1) preparing the rubber derivatives from purified rubber, by (2) washing the reaction products to remove water soluble impurities and by (3) modifying their physical properties by the addition of a non-hygroscopic material capable of modifying the plasticity of the rubber derivatives.

Illustrative examples of our preferred procedure are hereinbelow given:

*Example I.*—A balata-like derivative of rubber is prepared by mixing 100 parts by weight of purified rubber with 5 to 6 parts of phenol sulfonic acid, and the mix is heated in a compact mass in an oven maintained at a temperature of 286° F. for six hours. (The use of unpurified rubber in this example requires from 7 to 7.5 parts of phenol sulfonic acid to produce a product of similar physical properties.) Our final product possesses a higher degree of purity and has a lower moisture absorption, than the product as prepared from unpurified rubber.

We preferably wash the reaction product, as derived from either crude or purified raw rubber, for the further removal of water absorbing impurities.

*Example II.*—A gutta percha substitute is prepared by mixing 180 parts of the balata-like product of Example I with 20 parts of purified rubber, providing a tough, flexible material which can be calendered, tubed, molded or otherwise treated for the preparation of molded insulation or other articles. This product has a lower moisture absorption than the product prepared from crude rubber.

*Example III.*—A shellac-like product is obtained by mixing purified rubber-100, p-toluene sulfonic acid-8, and sulfuric acid (sp. gr. 1.84)-2, parts by weight, and heating the mass for 7½ hours at 190° F. followed by 10 hours at 266° F. This product is more nearly transparent in thin layers, breaks with a conchoidal fracture, grinds easier and is less hygroscopic than the product as prepared from unpurified rubber.

In preparing the heat-plastic derivatives of rubber hereinabove referred to satisfactory results have been obtained with both aliphatic and aromatic sulfonic acids, including ethyl sulfonic acid, benzene sulfonic acid, p-phenol sulfonic acid, p-toluene sulfonic acid, sulfo-salicylic acid, dichloro-benzene sulfonic acid, and other derivatives containing an available sulfonic acid group, as well as the acid chlorides of these sulfonic acids, also called organic sulfonyl chlorides, such as those of benzene, naphthalene, toluene, nitro-benzene, dichloro-benzene and the like.

*Example IV.*—An improved gutta percha substitute is prepared by mixing 42.5 parts of a shellac-like rubber derivative, such as described in Example III, with 32.5 parts of a balata-like derivative of rubber, such as described in Example I, and adding thereto 25.0 parts of purified rubber. A gutta percha-like material is thus produced which is much less hygroscopic than the product similarly obtained from unpurified rubber as described in the above-identified application of W. C. Geer.

In the foregoing examples, the purified rubber which is added to the heat-plastic derivatives for the purpose of modifying their plasticity may be replaced by Japan wax, Montan wax, paraffin wax or paraffin oil, petroleum, naphthalene, mineral oil, and other similar materials, the essential properties of all such material being that they have a low water absorption capacity and are capable of modifying the plasticity of the non-hygroscopic heat-plastic rubber derivatives.

Our invention may be variously modified as to procedure whereby the hygroscopic substances are eliminated, and we do not wholly limit our claims to the exact procedure described.

This application is a continuation of our copending application Serial No. 714,734, filed May 20, 1924.

We claim:

1. The method of producing a rubber composition having low moisture absorption which comprises effecting a reaction between rubber and an acid reagent containing the grouping $R-SO_2-X$, wherein R represents an organic radical or a hydroxy group and X represents chlorine or a hydroxy group, and mixing with the product a material having a low water absorption capacity to modify the plasticity of the substance.

2. The method of producing a rubber composition having low moisture absorption which comprises effecting a reaction between rubber and an acid reagent containing the grouping $R-SO_2-X$, wherein R represents an organic radical or a hydroxy group and X represents chlorine or a hydroxy group, washing the reaction product to remove water soluble impurities, and mixing therewith a material having a low water absorption capacity to modify the plasticity of the substance.

3. The method of producing a rubber composition having low moisture absorption which comprises effecting a reaction between purified raw rubber and acid reagent containing a compound having the grouping $R-SO_2-X$, wherein R represents an organic radical or a hydroxy group and X represents chlorine or a hydroxy group and mixing with the product a material having a low water absorption capacity to modify the plasticity thereof.

4. The method of producing a rubber composition having low moisture absorption which comprises (1) removal of natural impurities present in crude rubber, (2) effecting a reaction between the rubber and acid reagent containing a compound having the grouping $R-SO_2-X$, wherein R represents an aryl or a hydroxy group and X represents chlorine or a hydroxy group, (3) washing the reaction product to remove water soluble impurities and (4) mixing therewith a material having a low water absorption capacity to modify the plasticity of the substance.

In witness whereof we have hereunto set our hands, said WILLIAM C. GEER this 20th day of September, 1928, and said HARRY L. FISHER, this 30th day of October, 1928.

WILLIAM C. GEER.
HARRY L. FISHER.